(12) United States Patent
Goranson

(10) Patent No.: US 9,615,595 B2
(45) Date of Patent: Apr. 11, 2017

(54) METHOD AND APPARATUS FOR WASTELESS HOMOGENIZED SOYBEAN BEVERAGE PRODUCTION

(71) Applicant: MERA Technology International Inc., Regina, Saskatchewan (CA)

(72) Inventor: Wayne Kim Goranson, Regina (CA)

(73) Assignee: MERA TECHNOLOGY INTERNATIONAL INC., Regina (CA)

( * ) Notice: Subject to any disclaimer, the term of this patent is extended or adjusted under 35 U.S.C. 154(b) by 810 days.

(21) Appl. No.: 13/785,379

(22) Filed: Mar. 5, 2013

(65) Prior Publication Data

US 2014/0255571 A1 Sep. 11, 2014

(51) Int. Cl.
A23C 11/10 (2006.01)
A23L 11/30 (2016.01)

(52) U.S. Cl.
CPC .......... *A23C 11/103* (2013.01); *A23L 11/32* (2016.08); *A23L 11/35* (2016.08)

(58) Field of Classification Search
CPC ..... A23C 11/103; A23L 1/2116; A23L 1/2112
See application file for complete search history.

(56) References Cited

U.S. PATENT DOCUMENTS

| | | | |
|---|---|---|---|
| 969,238 A | 9/1910 | Wright et al. | |
| 3,816,389 A | 6/1974 | Mihara et al. | |
| 4,256,769 A | 3/1981 | Rice | |
| 4,971,825 A | 11/1990 | Kitazume et al. | |
| 5,225,233 A | 7/1993 | Komatsu et al. | |
| 6,022,867 A | 2/2000 | Ito et al. | |
| 6,140,096 A | 10/2000 | Kofod et al. | |
| 6,345,572 B1 * | 2/2002 | Kao | A23C 11/103 366/146 |
| 8,518,464 B2 | 8/2013 | Kim et al. | |
| 2002/0197350 A1 | 12/2002 | Akazawa | |
| 2003/0045580 A1 | 3/2003 | Einig | |
| 2003/0138534 A1 * | 7/2003 | Gupta | A23C 11/103 426/486 |
| 2010/0323075 A1 * | 12/2010 | Takai | A23C 11/103 426/495 |

FOREIGN PATENT DOCUMENTS

| | | |
|---|---|---|
| CA | 1083879 | 8/1980 |
| CA | 2511744 | 7/2004 |
| CA | 2633941 | 6/2007 |

OTHER PUBLICATIONS

International Search Report and Written Opinion dated Jul. 20, 2010 for Appl. PCT/BR2006/000179.
De Vries, R.P., et al., "Aspergillus enzymes involved in degradation of plant cell wall polysaccharides," Microbiology and Molecular Biology Reviews, 2001, vol. 65, No. 4, pp. 497-522.

* cited by examiner

Primary Examiner — Jianying Atkisson
(74) Attorney, Agent, or Firm — Frost Brown Todd LLC

(57) ABSTRACT

A method and apparatus for producing a soy beverage in a non-oxidizing process environment. Soybeans and water are mixed in a pulverizer to produce a slurry, which is then fed through a homogenizing mixer to produce a final beverage product with desired characteristics. The apparatus can be housed in a tamper-proof container with input and output connections for user interface.

7 Claims, 4 Drawing Sheets

METHOD AND APPARATUS FOR WASTELESS HOMOGENIZED SOYBEAN BEVERAGE PRODUCTION

FIELD OF THE INVENTION

The present invention relates to food production, and more particularly to production of a protein beverage derived from soybeans and water.

BACKGROUND OF THE INVENTION

It is known that soybeans can be used to produce a healthy, protein-rich beverage, usually by powdering a selected portion of the soybean and mixing the powder with hot water. However, numerous problems have been identified with conventional processing methods. For example, many processes use only a portion of the soybean, or a certain amount of waste is produced even where the process starts with whole beans. The latter can be seen, for example, in U.S. Pat. No. 4,971,825 to Kitazume et al., which discloses a process where the whole bean is used initially, but a "bean cured refuse" waste product is generated. This waste of protein and fibre is undesirable.

Another identified issue is the negative impact of heat and oxidation on flavour and appearance of the final beverage product. For example, U.S. Patent Application No. 20120183645 to Kim discloses a process for producing a soy milk beverage using whole beans. The process employs a heat chamber to metamorphose starch in the beans into dextrin, then the beans are ground into a powder, which powder is then mixed with water and subsequently homogenized and sterilized to generate the final product. The process, however, roasts the soybeans, and this oxidative process can introduce undesirable colours and flavours. For a beverage intended for human consumption, this is clearly problematic.

Various responses have been proposed to address the undesirable colours and flavours introduced by conventional processes. For example, PCT Application No. PCT/BR2006/000179 to Kai discloses a soy beverage process involving the use of pectinase enzyme to reduce unpleasant odour. The introduction of enzymes has become a well-known practice in soybean beverage production: see, as a further example, Canadian Patent No. 1,083,879 to Hsieh et al. which discloses a process for making a soybean beverage wherein whole beans are ground and then slurried with hot water, followed by the addition of enzymes. While enzyme additives do address the issue, they add to the cost of soybean beverage production and are therefore a less desirable solution.

Further, it has been found that soybeans incorporate trypsin inhibitors, which negatively impact digestibility of soybean beverages and reduce the body's ability to extract nutritive value from the beverage. While some prior art processes seek to remove the trypsin inhibitors during beverage processing, many others fail to recognize or address this significant problem at all.

What is needed, therefore, is a simplified method and apparatus for producing a soybean-based beverage, which reduces waste, limits or eliminates the need for enzymes or other additives, removes trypsin inhibitors and addresses the negative impact of oxidative processing environments.

SUMMARY OF THE INVENTION

The present invention accordingly seeks to provide a method and apparatus for processing soybeans into a beverage product, which occurs in a non-oxidative processing environment, does not require enzyme additives and uses the entire soybean.

According to a first aspect of the present invention there is provided an apparatus for producing a soy beverage from whole soybeans in a non-oxidizing process environment, the apparatus comprising:

an inlet in fluid communication with a hopper, the hopper for receiving the whole soybeans and water;

the hopper in selective fluid communication with a pulverizing system by means of an input valve, the pulverizing system for crushing the combined whole soybeans and water to form a slurry;

the pulverizing system in selective fluid communication with a mixing device, the mixing device for homogenizing the slurry to form the soy beverage; and the mixing device in selective fluid communication with an outlet.

In some embodiments of the present invention, the hopper is connected to a flush nozzle for receiving rinse water, which can drain into the pulverizing system. The pulverizing system itself preferably comprises a receiving tank, a discharge line downstream of and in fluid communication with the receiving tank, a cavitation valve downstream of and in fluid communication with the discharge line, and the cavitation valve having an outlet discharging into the receiving tank, with a pump for driving fluid through the receiving tank, discharge line and cavitation valve in sequence and a motor for driving the pump. The pulverizing system and input valve are preferably each in communication with a level indicator, the level indicator for determining when a predetermined fill level has been achieved in the pulverizing system and in response directing the input valve to close. Some embodiments may further comprise an agitation vessel interposed between the pulverizing system and the mixing device for receiving water and the slurry from the pulverizing system to arrive at a desired post-slurrying concentration. The apparatus may further comprise a flow-directing valve between the agitation vessel and the mixing device. The apparatus may further comprise a recirculation tank downstream of and in fluid communication with the mixing device, in which case the flow-directing valve may be a three-way valve allowing alternating fluid flow from the agitation tank and the recirculation tank to the mixing device. The outlet preferably comprises a control valve. The apparatus preferably further comprises at least one control panel and a basic process control system (BPCS) interface for the motor and other components of the apparatus.

According to a second aspect of the present invention there is provided a method for producing a soy beverage from whole soybeans in a non-oxidizing process environment, the method comprising the steps of:

a. combining whole soybeans and water;

b. placing the combined whole soybeans and water into a sealable pulverizing system;

c. sealing the pulverizing system to be substantially oxygen-free;

d. pulverizing the combined whole soybeans and water to form a slurry;

e. allowing substantial reduction of trypsin inhibitors;

f. transferring the slurry to a mixing device;

g. subjecting the slurry to mixing to produce a homogenized mixture; and h. pasteurizing the homogenized mixture to form the soy beverage.

In some methods according to the present invention, the whole soybeans are allowed to soak in the water after step a, and may be subjected to de-stoning and washing before being combined with the water. The ratio of whole soybeans to water is preferably approximately 1:3 by volume, but other ratios may be desirable. The step of pulverizing preferably comprises the use of a closed loop system involving cavitation to crush the combined whole soybeans and water to form the slurry. Where cavitation is employed, the cavitation may produce heat, and the method preferably comprises the further step of maintaining the slurry temperature in the range of 100 degrees C. to 106 degrees C., and most preferably in the range of 104 degrees C. to 106 degrees C. The slurry may be transferred to an agitation vessel for dilution to a desired consistency after step e but before step f. The method may comprise the additional step of packaging the soy beverage, and also the additional step of providing a BPCS to enable remote control of the method.

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention.

Figure 1:
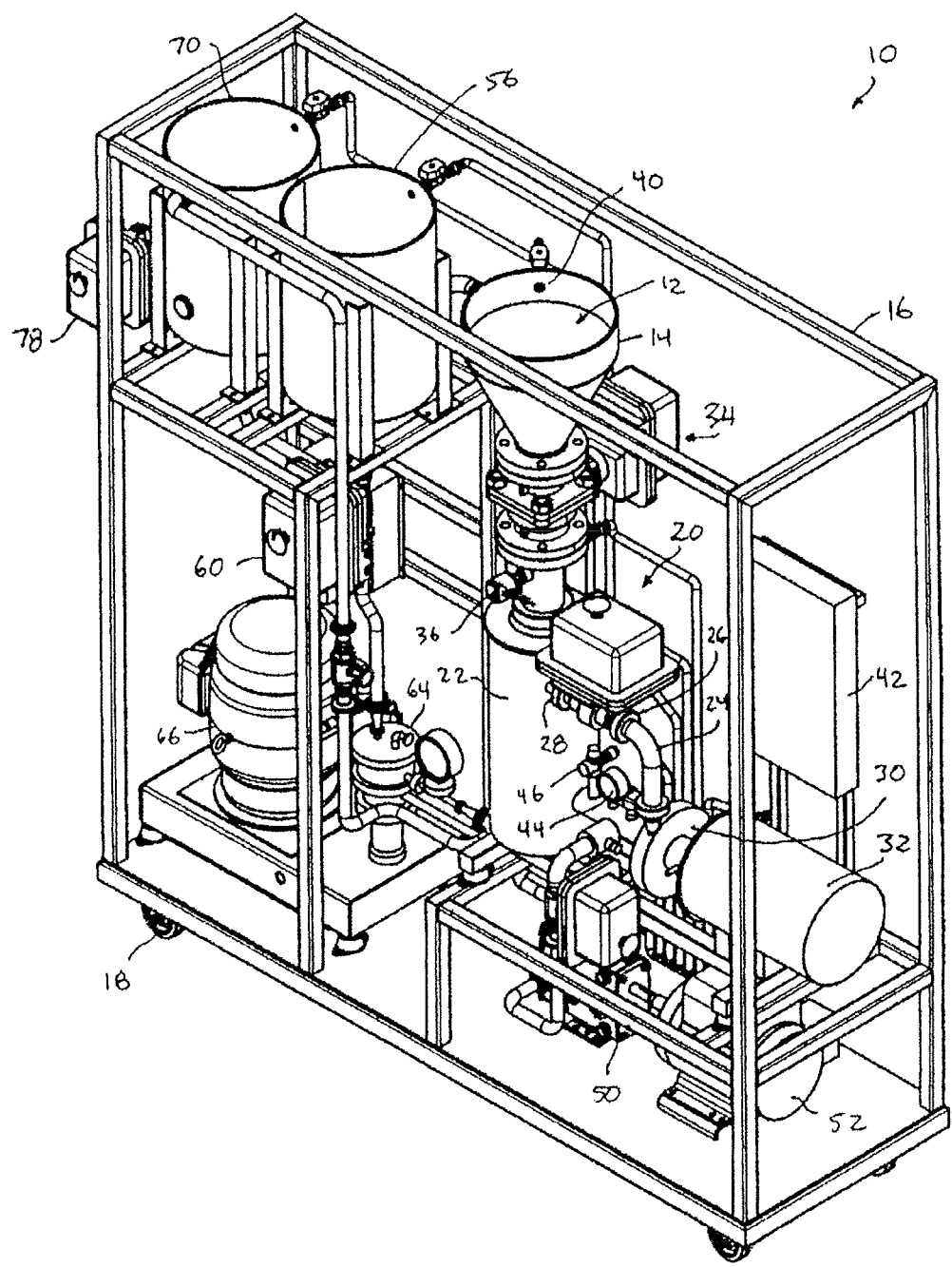
FIG. 1 is a perspective view of an apparatus according to the present invention.

An exemplary embodiment of the present invention will now be described with reference to the accompanying drawings.

DETAILED DESCRIPTION OF EXEMPLARY EMBODIMENT

Referring now to the accompanying drawings, an embodiment of an apparatus and method according to the present invention is illustrated. It is to be understood that the illustrated embodiment is exemplary only and other embodiments may properly fall within the scope of the claims.

Referring now in detail to FIGS. 1 to 4, an apparatus 10 according to the present invention is illustrated. The apparatus 10 and a method of its use will now be described. Only those elements and aspects of the apparatus 10 necessary for understanding its operation will be described, as other elements and aspects will be obvious to those skilled in the art and accordingly require no description. Particular operating parameters and process conditions are not defined other than as exemplary test runs, as such will be dependent on the size and details of the equipment used, the input characteristics and the defined output specifications, and such parameters and conditions would be determinable by one skilled in the art.

Before processing of the soybeans in the apparatus 10, bean selection should be undertaken to improve product quality, as would be known to those skilled in the art. A bland product is desirable, without off-putting odours or flavours, particularly where the beverage product is used as a milk substitute. The operator should first weigh out a desired amount of beans, and then pre-condition the beans; pre-conditioning may include colour sorting (using, for example, colour sorting equipment manufactured by the Satake group of companies), de-stoning, and washing. Organic albino beans are preferable. The process of the present invention then uses whole beans, hull and seed, thereby capturing the value of the full fibre content.

The exemplary method then moves to the apparatus 10, as the pre-conditioned beans are poured through the inlet 12 into the hopper 14. The hopper 14 and other components described below are mounted on a frame 16, which frame is provided with castor wheels 18 for ease of movement. The frame 16 of the apparatus 10 is preferably contained within a container such as a shipping cargo container (not shown), which container can be sealed to prevent tampering, in which case the inlet 12 and other desirable operator interface elements can be configured to extend outwardly of the container or be positioned within a recess in the container surface to enable operator access.

At or near the same time as the beans are poured into the hopper 14 through the inlet 12, water is introduced into the hopper 14 through a flush nozzle 40 or other input mechanism. While the preferred ratio of beans to water according to the present invention is 1:3 by volume, the actual desired ratio depends on the final protein level the operator is seeking to produce. The beans are allowed to soak in the hopper 14 for a predetermined amount of time, thereby taking on some of the water and consequently expanding and softening. This expansion and softening may be necessary depending on the nature of the pulverizing system employed.

In the exemplary embodiment described herein, the preferred pulverizing system 20 is one manufactured generally in accordance with the principles set out in Canadian Patent No. 2,511,744 to Osipenko and Canadian Patent Application No. 2,633,941 to Osipenko et al., and available from the TekMash Group. The pulverizing system 20 comprises a receiving tank 22, a discharge line 24, a cavitation valve 26, a cavitation valve outlet 28, and a centrifugal pump 30 driven by a motor 32.

Figure 2:
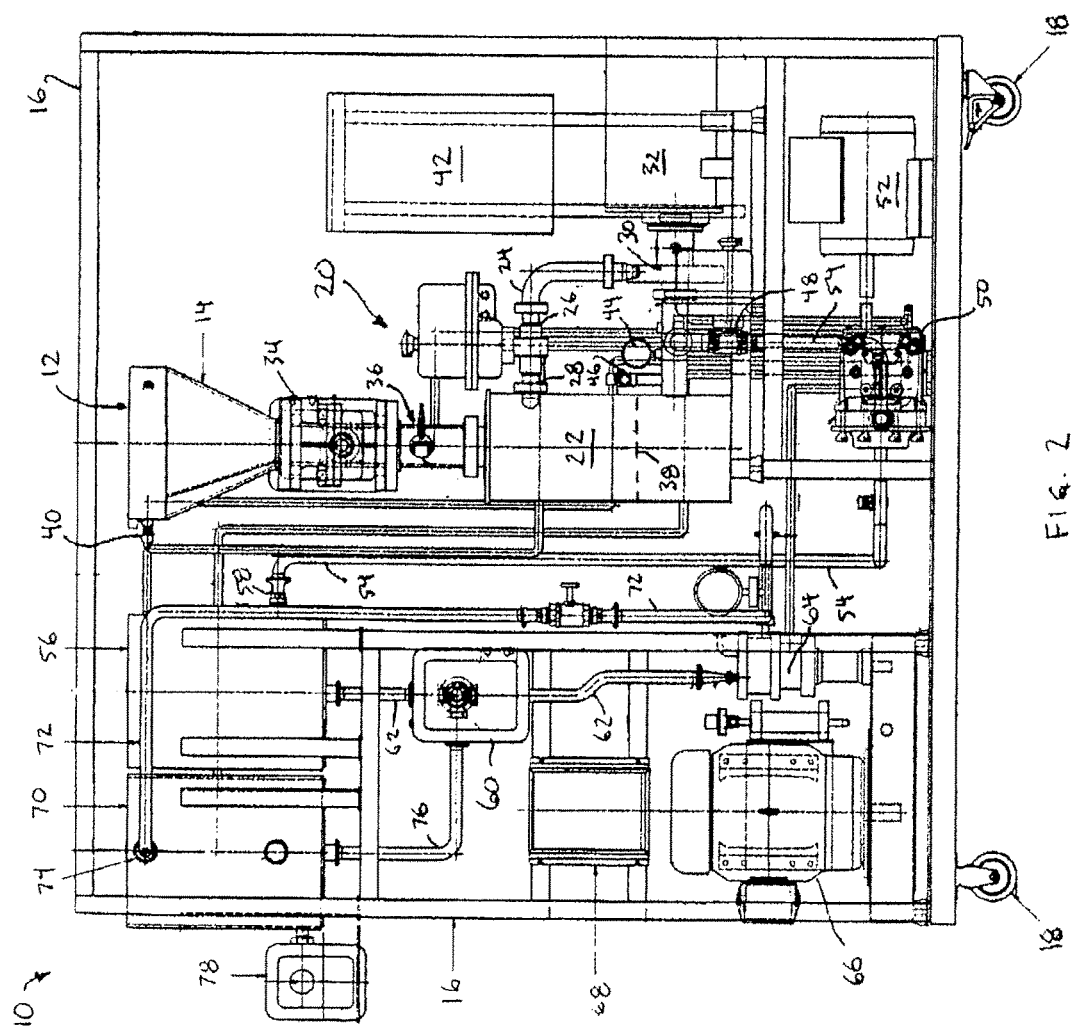
FIG. 2 is a front elevation view of the apparatus of FIG. 1.
Figure 3:
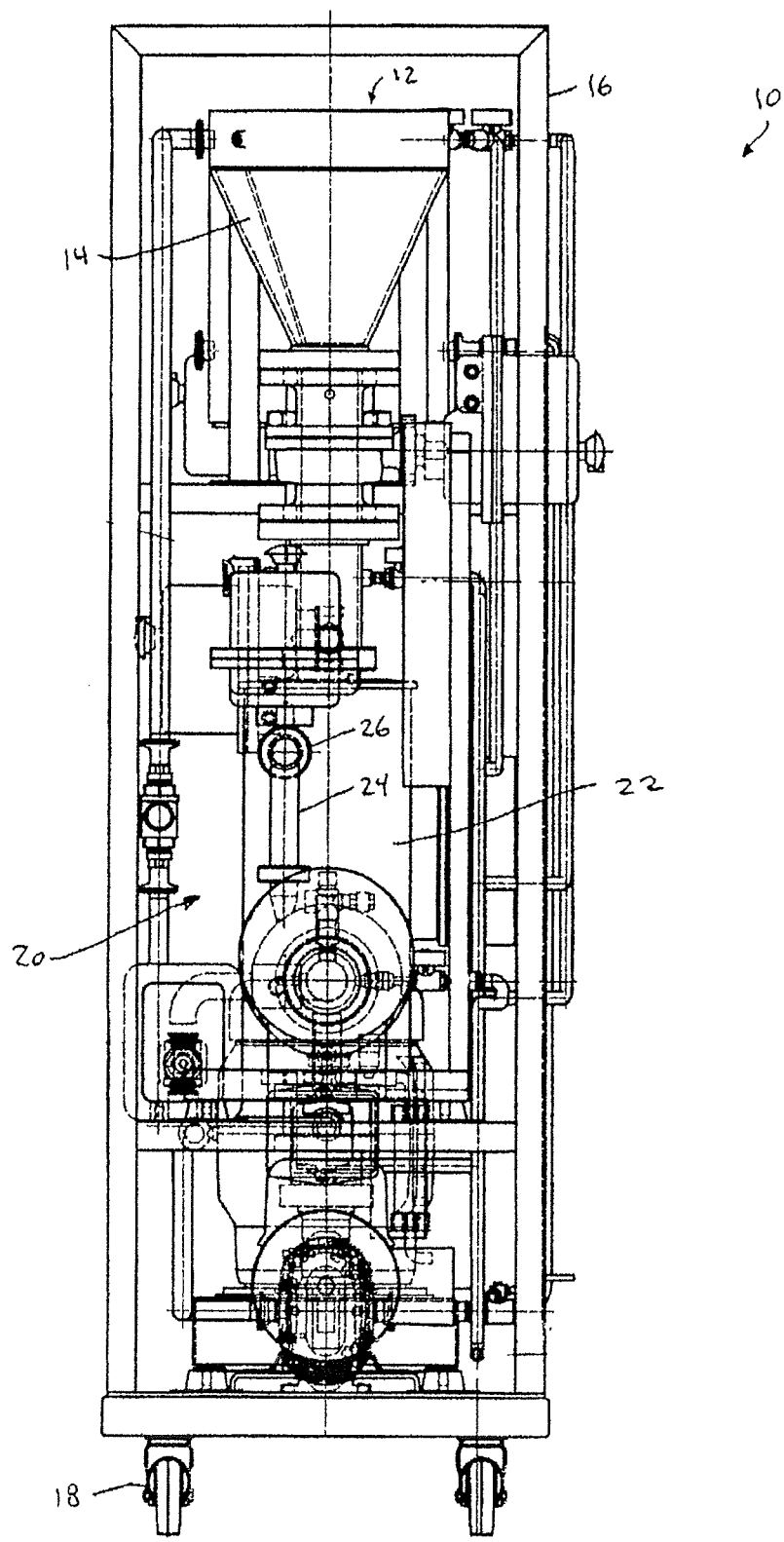
FIG. 3 is a side elevation view of the apparatus of FIG. 1.
Figure 4:
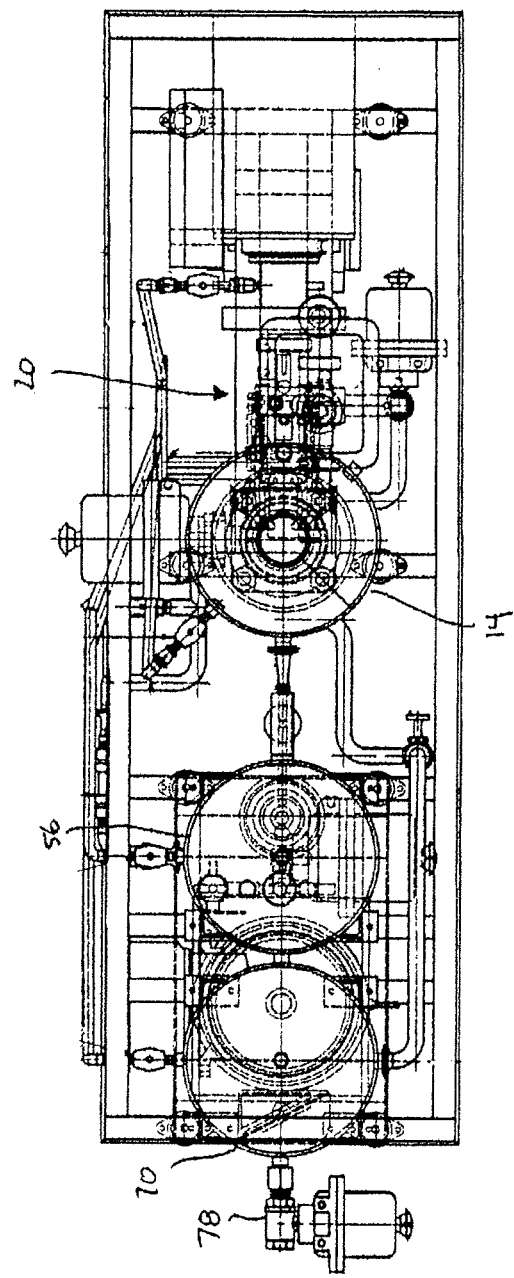
FIG. 4 is a top plan view of the apparatus of FIG. 1.

As can be seen in FIG. 2, a ball valve 34 is interposed between the hopper 14 and the pulverizing system 20. The ball valve 34 provides selective sealing of the pulverizing system 20. The ball valve 34 communicates with a level indicator 36 as described below.

Before or during the soaking of the beans in the hopper 14, the user fills the receiving tank 22 of the pulverizing system 20 with water to an initial fill line 38. Once the beans have been soaked for the predetermined period, the operator opens the ball valve 34 and dumps the bean/water mixture into the receiving tank 22. The hopper 14 is also connected to the flush nozzle 40 which injects rinse water into the hopper 14 and then drains into the receiving tank 22. Once the combination of the initial water fill, bean/water mixture and rinse water attains the level of the level indicator 36, the level indicator 36 operates to close the ball valve 34, thereby sealing the pulverizing system 20 and preventing introduction of atmospheric oxygen.

At this point in the process and given the height of the level indicator 36 in relation to the components of the pulverizing system 20, the pulverizing system 20 is essentially full of beans and water such that there is substantially no free oxygen in the processing components at this time, thereby preventing oxidation and undesired effects such as odour and flavour impacts.

Once the ball valve 34 has sealed the pulverizing system 20, pulverization of the beans can begin. The pulverization step preferably but not necessarily starts with the pulverizing system 20 contents at about 20 degrees C., but the bean/water mixture will increase in temperature due to the processing, as described below.

To begin the pulverization step, the operator starts the motor 32 which drives the centrifugal pump 30. The motor 32 is connected to a control panel 42, and the control panel 42 is provided with conventional remote control capability to enable operation from a remote location. The bean/water mixture is pumped by the centrifugal pump 30 out of the receiving tank 22 into the discharge line 24. It is important to prevent cavitation in the pump 30 to avoid damage to the pump 30, and a skilled person would be able to address this by selecting an appropriate situation-specific flow rate. As the bean/water mixture is pumped through the discharge line 24, the discharge line 24 converts the anticipated turbulent flow into laminar flow, which is advantageous for the subsequent cavitation step.

The cavitation valve 26 is a Venturi valve with a flow restriction. As will be known to those skilled in the art, pressure increases upstream of the flow restriction, but pressure decreases and velocity increases around the restriction. Particles in the fluid are therefore forcefully driven in the direction of fluid flow, resulting in the generation of heat, and the beans are crushed by the impacts in the valve 26 and more thoroughly mixed with the water. One key benefit of this arrangement is that while the fluid is heated, there is no significant heating of the inner valve surfaces and therefore no caking. This crushing and mixing forms the slurry. The slurry is passed through the receiving tank 22, pump 30, discharge line 24, cavitation valve 26 and cavitation valve outlet 28 in series a number of times, the actual number of cycles depending on the particular equipment specifications, input characteristics and desired output specifications.

The heat produced by the cavitation heats the slurry to approximately 106 degrees C. through these repeated cycles, which may take approximately 45 minutes but could take more or less time than this depending on the equipment and the operating parameters and conditions. Once the slurry reaches 106 degrees C., a thermocouple (not shown) detects this temperature threshold and automatically causes the motor 32 to shut down, thereby shutting down the pump 30 and the pulverization action. A timer (not shown) then begins to count down a cooling period, which may be but is not necessarily approximately 15 minutes. This period is undertaken to maintain the slurry in the temperature range of approximately 104 degrees C. to approximately 106 degrees C., but no lower than 100 degrees C. The motor 32 is then restarted and the slurry processing continues, with slurry heat increasing again due to cavitation. It should be noted that this part of the method impacts pressure within the pulverizing system 20, and the pulverizing system 20 is accordingly provided with a pressure gauge 44 and relief valve 46 to relieve pressure as necessary, as would be obvious to implement to those skilled in the art. The desired temperature range is important in that sugars are not caramelized and the 15-minute period has been determined to be sufficient to allow substantial reduction of the trypsin inhibitors in the slurry. As trypsin helps in the digestion of the protein in the soy beans, this is a key aspect of the present invention. The process therefore breaks down enzymes, deodorizes and deflavours the slurry.

After the desired pulverization has been completed, the motor 32 and pump 30 shut down, a valve 48 opens and the slurry passes through a line 54 to a transfer pump 50, which transfer pump 50 is driven by a motor 52. The transfer pump 50 may not be required if there is sufficient pressure built up in the pulverizing system 20 to drive the slurry to the agitation vessel 56 (described below). The line 54 has previously been filled with water, again to avoid oxygen exposure.

The slurry at this stage is preferably a thick, full-fibre soy paste, approximately 15% pure protein. The next step in the exemplary method is to dilute this paste to a desired concentration and then homogenize it to arrive at a desirable beverage consistency.

The agitation vessel 56 is initially filled with water to a level above the agitation vessel inlet 58, again to help avoid aeration/oxidation. Aeration/oxidation is also disadvantageous for another reason, as it can result in foaming in the agitation vessel 56, which air bubbles can negatively impact the downstream shear mixing step (discussed below). The slurry paste produced by the pulverizing system 20 is pumped through the line 54 to the agitation vessel inlet 58 (which is preferably a check valve) and thence forcefully injected into the agitation vessel 56. The forceful injection helps to agitate and therefore mix the paste and the water in the agitation vessel 56. The agitation vessel 56 is also preferably provided with baffles of conventional design (not shown) to help break vortices in the agitation vessel 56.

While the slurry is in the agitation vessel 56, the pulverizing system 20 is refilled with water to the initial fill line 38, and a pulverizing cycle is run with water only to clean the pulverizing system 20, which cycle may take approximately 5 minutes. This rinse water is then pumped through the line 54 to the agitation vessel 56, using either the transfer pump 50 or possibly by adding nitrogen to pressurize the pulverizing system 20 to drive the rinse water transfer. With the introduction of this rinse water, the agitation vessel 56 is now full and at a desired concentration, which desired concentration depends on the desired end product consistency and texture. In a preferred embodiment, the end product concentration should manifest approximately 10 g protein per 330 mL serving.

The diluted and mixed slurry in the agitation vessel 56 is then dumped into a three-way valve 60. On the first pass through the valve 60, the slurry passes down through the valve 60 and a line 62 to a mixing device, which in this embodiment is a shear mixer 64, which is used to generate a homogenized product from the slurry. The shear mixer 64 is driven by a motor 66, which is connected to a control panel 68. A shear mixer capable of use with the present invention is the Quadro® HV0 produced by Quadro Engineering Corp., although the particular type and size of shear mixer will depend in part on the volume of diluted slurry to be processed. The soybean particles should be smaller than 15 microns in diameter, as particles larger than that are known to produce an undesirable gritty feel on the tongue, and the shear mixer 64 is intended to achieve the desired particle size through screening and homogenization. The shear mixer 64 hydrolyzes the fats in the diluted pulverizer output, creating a dispersion rather than a suspension.

After shear mixing, the slurry then passes back up through a line 72 and a recirculation tank inlet 74 to a recirculation tank 70, which recirculation tank 70 allows the slurry to pass through the shear mixer 64 multiple times as desired. The slurry is dumped back down to the three-way valve 60 through a line 76, and then down to the shear mixer 64. The slurry undergoes multiple passes through the shear mixer 64, and the actual number of passes will depend on the situation-specific materials and conditions. An in-line food analyzer (not shown) may be provided on the line 76 from the recirculation tank 70 into the three-way valve 60 to test the slurry for protein content if desired; the use of an in-line food analyzer would allow for the introduction of additional process water to modify concentration. Protein content per unit volume of homogenized product can be determined using known ultrasonic density measuring techniques. The homogenized product then goes from the recirculation tank 70 to the outlet 78, and can then be transferred to a pasteurizer and chiller, and thence to packaging as desired.

It has been determined that it may take approximately 80 minutes for this entire processing cycle of beans into finished homogenized product. The present invention also comprises the use of multiple pulverizing systems operating in series; for example, if three pulverizing systems are set to operate in a staggered manner, with each cycle initiation beginning approximately 27 minutes apart, one can have near-continuous production of homogenized product from the single outlet with each of the pulverizing systems taking turns feeding to the shear mixer. Separate shipping containers can be used for power supply, bean supply, and any other desired supporting elements.

EXAMPLES

Four test runs were conducted using an apparatus in accordance with the within description, including a Tekmash® pulverizing system manufactured generally in accordance with the principles set out in Canadian Patent No. 2,511,744 to Osipenko and Canadian Patent Application No. 2,633,941 to Osipenko et al., and a Quadro® shear mixer.

Based on an assumed desirable protein content of 10.5 g per 330 mL beverage serving, at 40% protein content, 10.5 g of protein requires 10.5/0.4=26 g of dry matter. Assuming the average water content of soybeans is 10%, 26/0.9=29 g of soybeans was needed to produce the 330 mL serving. As soybeans and water are relatively equivalent in terms of density, the assumption was made that additional water was required in the amount of 330−29=301 g. Thus, it was determined that a ratio of 301 g water for 29 g soybeans was required, or approximately 10.4:1. It was determined that the pulverizer would run at a desired performance level with a water to solids ratio of 3:1; with a total capacity of 6 L, it was decided to run approximately 1.5 kg of soybeans in 4.5 L of water. Having selected 1.55 kg soybeans as a starting point, the dry matter was calculated at 1.55 kg×0.9 or approximately 1.40 kg. With a protein content of 40%, the test sample had a protein content of 1.40 kg×0.4 or approximately 560 g.

Using the ratio calculation, for 301 g of water per 29 g of soybeans a total water volume was determined as follows: 301/29×1.55=16.1 kg of water, equivalent to 16.1 L. As the pulverizer already provided 4.5 L of water, an additional 11.6 L of water was required once the pulverizer product had been produced. For the thinner product in Test 3 below, the required water was calculated as 301/29×1.20=12.4 L, and with 4.8 L from the pulverization step only an additional 7.6 L was required. To thoroughly homogenize the lower volume (approximately 14 L compared to approximately 18 L), the shear mixer could be run for a shorter time than with a thicker sample.

Test 1:
Initial water/solid ratio: 3:1
Dry matter soy, based on 10% m.c.: 1.40 kg
Protein, based on 40% average content: 560 g
Initial process temperature: 17.6 degrees C.
Tekmash average current: 7.4 A
Tekmash processing time to 105 degrees C.: 44 minutes
Tekmash processing pump run times during hold at 105 degrees C.: 5 minutes
Quadro time: 10 minutes
Total time including 15 minute hold time and shear mixing: 69 minutes
Processing power in Tekmash (measured): 1.94 kWh
Processing power in Quadro (estimated): 1.02 kWh
Total processing energy: 2.96 kWh
Processing efficiency: 12.3 minutes/100 g protein
Energy efficiency: 0.53 kWh/100 g protein Test 2:
Initial water/solid ratio: 3:1
Dry matter soy, based on 10% m.c.: 1.40 kg
Protein, based on 40% average content: 560 g
Initial process temperature: 19.6 degrees C.
Tekmash average current: 7.6 A
Tekmash processing time to 105 degrees C.: 43 minutes
Tekmash processing pump run times during hold at 105 degrees C.: 4 minutes
Quadro time: 10 minutes
Total time including 15 minute hold time and shear mixing: 68 minutes
Processing power in Tekmash (measured): 1.95 kWh
Processing power in Quadro (estimated): 1.02 kWh
Total processing energy: 2.97 kWh
Processing efficiency: 12.1 minutes/100 g protein
Energy efficiency: 0.53 kWh/100 g protein Test 3:
Initial water/solid ratio: 4:1 (note: more diluted input)
Dry matter soy, based on 10% m.c.: 1.08 kg
Protein, based on 40% average content: 430 g
Initial process temperature: 21.0 degrees C.
Tekmash average current: 7.5 A
Tekmash processing time to 105 degrees C.: 50 minutes
Tekmash processing pump run times during hold at 105 degrees C.: 6 minutes
Quadro time: 8 minutes
Total time including 15 minute hold time and shear mixing: 73 minutes
Processing power in Tekmash (measured): 2.25 kWh
Processing power in Quadro (estimated): 0.81 kWh
Total processing energy: 3.06 kWh
Processing efficiency: 17.0 minutes/100 g protein
Energy efficiency: 0.71 kWh/100 g protein
Note: During Test 3, the pressure gauge vibrated around 2.5 bars and the pressure relief valve discharged about 30 g of product (less than 1% loss).

Test 4:
Initial water/solid ratio: 3:1
Dry matter soy, based on 10% m.c.: 1.40 kg
Protein, based on 40% average content: 560 g
Initial process temperature: 23.5 degrees C.
Tekmash average current: 7.3 A
Tekmash processing time to 105 degrees C.: 49 minutes
Tekmash processing pump run times during hold at 105 degrees C.: 6 minutes
Quadro time: 10 minutes
Total time including 15 minute hold time and shear mixing: 74 minutes
Processing power in Tekmash (measured): 2.15 kWh
Processing power in Quadro (estimated): 1.02 kWh
Total processing energy: 3.17 kWh
Processing efficiency: 13.2 minutes/100 g protein
Energy efficiency: 0.57 kWh/100 g protein As indicated above, it is possible to incorporate additional features into the method and apparatus described above, such as BPCS automation and remote security features. As would be obvious to one skilled in the art and relatively simple to implement, a remote control system can be integrated to enable maintenance, operation, cleaning, and status updates.

As can be readily seen, then, the apparatus and method of the present invention present significant advantages over the prior art. For example, the whole bean is used, with no waste, thereby capturing the full fibre content for consumers. The non-oxidizing process environment helps ensure that undesirable odours and flavours are avoided, and enzyme additives are not required. It is a simple process, with only beans and water as inputs, and the controlled temperature range allows for the substantial reduction of trypsin inhibitors without caramelizing sugars.

The foregoing is considered as illustrative only of the principles of the invention. Thus, while certain aspects and embodiments of the invention have been described, these have been presented by way of example only and are not intended to limit the scope of the invention. The scope of the claims should not be limited by the exemplary embodiments set forth in the foregoing, but should be given the broadest interpretation consistent with the specification as a whole.

The invention claimed is:

1. An apparatus for producing a soy beverage from whole soybeans in a non-oxidizing process environment, the apparatus comprising:
   an inlet in fluid communication with a hopper, the hopper for receiving the whole soybeans and water;
   the hopper in selective fluid communication with a pulverizing system by means of an input valve, the pulverizing system for crushing the combined whole soybeans and water to form a slurry;
   the pulverizing system in selective fluid communication with a mixing device, the mixing device for homogenizing the slurry to form the soy beverage; and
   the mixing device in selective fluid communication with an outlet;
   wherein the pulverizing system comprises:
      a receiving tank;
      a discharge line downstream of and in fluid communication with the receiving tank;
      a cavitation valve downstream of and in fluid communication with the discharge line, the cavitation valve having an outlet discharging into the receiving tank;
      a pump for driving fluid through the receiving tank, discharge line and cavitation valve in sequence; and
      a motor for driving the pump.

2. The apparatus of claim 1 wherein the hopper is connected to a flush nozzle for receiving rinse water.

3. The apparatus of claim 1 wherein the pulverizing system and input valve are in communication with a level indicator, the level indicator for determining when a predetermined fill level has been achieved in the pulverizing system and in response directing the input valve to close.

4. An apparatus for producing a soy beverage from whole soybeans in a non-oxidizing process environment, the apparatus comprising:
   an inlet in fluid communication with a hopper, the hopper for receiving the whole soybeans and water;
   the hopper in selective fluid communication with a pulverizing system by means of an input valve, the pulverizing system for crushing the combined whole soybeans and water to form a slurry;
   the pulverizing system in selective fluid communication with a mixing device, the mixing device for homogenizing the slurry to form the soy beverage;
   the mixing device in selective fluid communication with an outlet;
   an agitation tank interposed between the pulverizing system and the mixing device for receiving water and the slurry from the pulverizing system;
   a flow-directing valve between the agitation tank and the mixing device; and
   a recirculation tank downstream of and in fluid communication with the mixing device;
   wherein the flow-directing valve is a three-way valve allowing alternating fluid flow from the agitation tank and the recirculation tank to the mixing device.

5. The apparatus of claim 1 wherein the outlet comprises a control valve.

6. The apparatus of claim 1 further comprising at least one control panel.

7. The apparatus of claim 1 further comprising a basic process control system interface for the motor.

* * * * *